United States Patent
Sibbach et al.

(10) Patent No.: US 11,965,424 B2
(45) Date of Patent: Apr. 23, 2024

(54) ELECTRONIC OVERSPEED PROTECTION SYSTEM AND METHOD

(71) Applicant: General Electric Company, Schenectady, NY (US)

(72) Inventors: Arthur William Sibbach, Boxford, MA (US); Brandon Wayne Miller, Liberty Township, OH (US); Erich Alois Krammer, West Chester, OH (US); Douglas Scott Jacobs, Boston, MA (US); Joseph Alfred Iannotti, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/844,940

(22) Filed: Jun. 21, 2022

(65) Prior Publication Data
US 2023/0407761 A1 Dec. 21, 2023

(51) Int. Cl.
| | | |
|---|---|---|
| *F01D 21/02* | (2006.01) | |
| *F02C 9/28* | (2006.01) | |
| *F02C 9/46* | (2006.01) | |
| *F02C 9/50* | (2006.01) | |

(52) U.S. Cl.
CPC .............. *F01D 21/02* (2013.01); *F02C 9/28* (2013.01); *F02C 9/46* (2013.01); *F02C 9/50* (2013.01); *F05D 2270/021* (2013.01); *F05D 2270/304* (2013.01); *F05D 2270/335* (2013.01)

(58) Field of Classification Search
CPC ........ F01D 21/00; F01D 21/003; F01D 21/02; F01D 21/04; F01D 21/06; F01D 21/14; F02C 9/46
See application file for complete search history.

(56) References Cited

U.S. PATENT DOCUMENTS

| | | |
|---|---|---|
| 7,100,378 B2 | 9/2006 | Matthews |
| 7,222,541 B2 | 5/2007 | Lohr et al. |
| 7,343,804 B2 | 3/2008 | Liu et al. |
| 7,677,089 B2 | 3/2010 | Block et al. |

(Continued)

FOREIGN PATENT DOCUMENTS

| | | | | |
|---|---|---|---|---|
| EP | 1036917 B1 | * | 12/2004 | ............. F01D 21/02 |
| FR | 2947300 A1 | * | 12/2010 | ............ F01D 21/003 |
| FR | 3099789 A1 | * | 2/2021 | ............. F01D 17/06 |

*Primary Examiner* — Alain Chau
(74) *Attorney, Agent, or Firm* — Dority & Manning, P.A.

(57) ABSTRACT

A method for providing overspeed protection for a gas turbine engine having an engine shaft includes monitoring, via an overspeed protection system, a torque of the engine shaft. The method also includes determining, via the overspeed protection system, at least one additional condition of the engine shaft. Further, the method includes determining, via the overspeed protection system, an overspeed condition of the gas turbine engine when the torque of the engine shaft drops below a torque threshold and the at least one additional condition of the engine shaft is indicative of the gas turbine engine being in an operational state. Thus, the overspeed condition is indicative of an above normal rotational speed of the engine shaft. In addition, the method includes initiating a shutdown procedure for the gas turbine engine in response to the determined overspeed condition to reduce the rotational speed of the engine shaft.

19 Claims, 5 Drawing Sheets

(56) References Cited

U.S. PATENT DOCUMENTS

| | | | |
|---|---|---|---|
| 7,716,971 B2 | 5/2010 | Block et al. | |
| 7,759,810 B2 | 7/2010 | Kumar | |
| 8,104,289 B2 | 1/2012 | McCune et al. | |
| 8,159,081 B2 | 4/2012 | Gainford et al. | |
| 8,266,886 B2 | 9/2012 | McCune et al. | |
| 8,621,871 B2 | 1/2014 | McCune et al. | |
| 8,796,980 B2 | 8/2014 | Wise et al. | |
| 9,470,152 B2 | 10/2016 | MacDonald et al. | |
| 10,047,678 B2* | 8/2018 | Certain | F02C 9/26 |
| 10,088,385 B2 | 10/2018 | D'Orlando et al. | |
| 10,180,078 B2* | 1/2019 | Roach | B64D 45/00 |
| 10,190,438 B2* | 1/2019 | Langford | F02C 3/10 |
| 10,208,620 B2 | 2/2019 | Montoya et al. | |
| 10,228,305 B2* | 3/2019 | Shenouda | G01M 15/14 |
| 10,316,689 B2 | 6/2019 | Fletcher | |
| 10,450,863 B2 | 10/2019 | Jacobs et al. | |
| 10,465,554 B2 | 11/2019 | MacDonald | |
| 10,487,752 B2 | 11/2019 | Fiedler et al. | |
| 10,738,646 B2 | 8/2020 | Sheridan | |
| 10,774,678 B2 | 9/2020 | Snyder et al. | |
| 10,781,714 B2 | 9/2020 | Negri et al. | |
| 10,934,844 B2 | 3/2021 | Engel et al. | |
| 10,996,082 B2 | 5/2021 | Iannotti | |
| 11,053,861 B2 | 7/2021 | Moster et al. | |
| 11,168,621 B2* | 11/2021 | McCarthy | F02C 9/42 |
| 2013/0098042 A1* | 4/2013 | Frealle | F02C 3/10 60/734 |
| 2015/0184533 A1* | 7/2015 | Panicker | F01D 21/14 416/61 |
| 2016/0090918 A1* | 3/2016 | Certain | F01D 21/02 415/16 |
| 2016/0178464 A1* | 6/2016 | Burns | F02C 3/10 73/112.01 |
| 2016/0298486 A1* | 10/2016 | Langford | F02C 9/46 |
| 2017/0167287 A1 | 6/2017 | Jacobs et al. | |
| 2018/0010980 A1* | 1/2018 | Shenouda | F01D 21/045 |
| 2018/0045071 A1* | 2/2018 | Roach | G01L 5/00 |
| 2020/0131918 A1 | 4/2020 | Calderon et al. | |
| 2020/0173297 A1 | 6/2020 | Merry et al. | |
| 2020/0217324 A1 | 7/2020 | Sheridan et al. | |
| 2020/0284206 A1* | 9/2020 | Mccarthy | F02C 6/02 |
| 2020/0339268 A1 | 10/2020 | Mark et al. | |
| 2021/0017880 A1 | 1/2021 | Trappier et al. | |
| 2021/0017979 A1 | 1/2021 | Iannotti et al. | |
| 2021/0354837 A1 | 11/2021 | Mark et al. | |
| 2021/0354840 A1 | 11/2021 | Mark et al. | |
| 2022/0162961 A1* | 5/2022 | Maddaleno | F01D 17/06 |
| 2023/0010174 A1* | 1/2023 | McCarthy | F02C 7/36 |

* cited by examiner

ELECTRONIC OVERSPEED PROTECTION SYSTEM AND METHOD

FIELD

The present disclosure relates to a gas turbine engine, and more particularly, to an electronic overspeed protection system for a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Gas turbine engines often include overspeed protection systems that provide overspeed protection. Several factors may lead to the result of an engine overspeed, such as control failure or mechanical failure, e.g., a sheared shaft in a turboprop application. For example, in some instances, when an engine incorporates a gearbox between the low pressure turbine and the fan, it is possible to encounter a loss of load event in which the fan shaft breaks, but the low pressure turbine shaft and associated bearings remain intact, allowing the low pressure turbine to rapidly accelerate without a load. In the case of a failed shaft, the loss of resistance to torque may cause the shaft to subsequently overspeed. Such overspeeding may cause increased damage due to failure of turbine blades or rotor and the possibility of destruction of the engine. As a result, there is a danger that greater damage to the engine will occur if an overspeed is left unchecked.

Some existing overspeed protection systems attempt to limit rotor speed by cutting off fuel to the engine. This has been done in both electronic and hydromechanical fashion, wherein the fuel metering valve is closed and/or a bypass valve is opened up, preventing the additional flow of fuel to the engine when an overspeed event is detected. However, such measures may be insufficient to prevent destructive overspeed events. Many modern engines are able to generate greater amounts of energy without significantly increasing the overall engine mass. This may result in the need for more aggressive actions to prevent destructive overspeed events.

Accordingly, improved electronic overspeed protection systems are desired. For instance, an electronic overspeed protection system for a gas turbine engine that incorporates a sensor system that measures shaft torque to detect the aforementioned overspeed conditions would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

The term "overspeed condition" as used herein is generally understood to indicate a state within the gas turbine engine that might cause an engine shaft to rotate at an above-average or above-normal velocity (e.g., an engine shaft break).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Gas turbine engines often include overspeed protection systems that provide overspeed protection. Several factors may lead to the result of an engine overspeed, such as control failure or mechanical failure. For example, in some instances, when an engine incorporates a gearbox between the low pressure turbine and the fan, it is possible to encounter a loss of load event in which the fan shaft breaks, but the low pressure turbine shaft and associated bearings remain intact, thereby allowing the low pressure turbine to rapidly accelerate without a load. In the case of a failed shaft, the loss of resistance to torque may cause the shaft to subsequently overspeed. Such overspeeding may cause increased damage due to failure of turbine blades or rotor and the possibility of destruction of the engine. As a result, there is a danger that greater damage to the engine will occur if an overspeed is left unchecked.

Thus, the present disclosure is directed to an improved electronic overspeed protection system for a gas turbine engine that incorporates a sensor system that measures shaft torque to detect the aforementioned overspeed conditions. In particular embodiments, for example, the torque sensor system incorporates independent and redundant sensors for two or more channels to provide the necessary reliability, as well as features to prevent sensor failures and/or false trips from causing inadvertent engine shutdown events. By using a reduction in shaft torque to initiate an overspeed shutdown, the system can activate faster than a speed only sensor-based system as it is not necessary to wait for the low-pressure turbine to begin accelerating above rated speed before tripping. Once the overspeed condition is detected, the shutdown procedure may include shutting off fuel flow, closing inlet guide vanes and/or compressor stators, opening a valve to release compressor discharge air, closing a variable area turbine nozzle, and/or closing blocker doors to stop air flow into a core inlet of the gas turbine engine. As a further safety feature, the sensors may be connected to a dedicated controller separate from the main engine control. The overspeed system may also react to other failures as well, such as a stuck or opening fuel metering valve.

Figure 1:
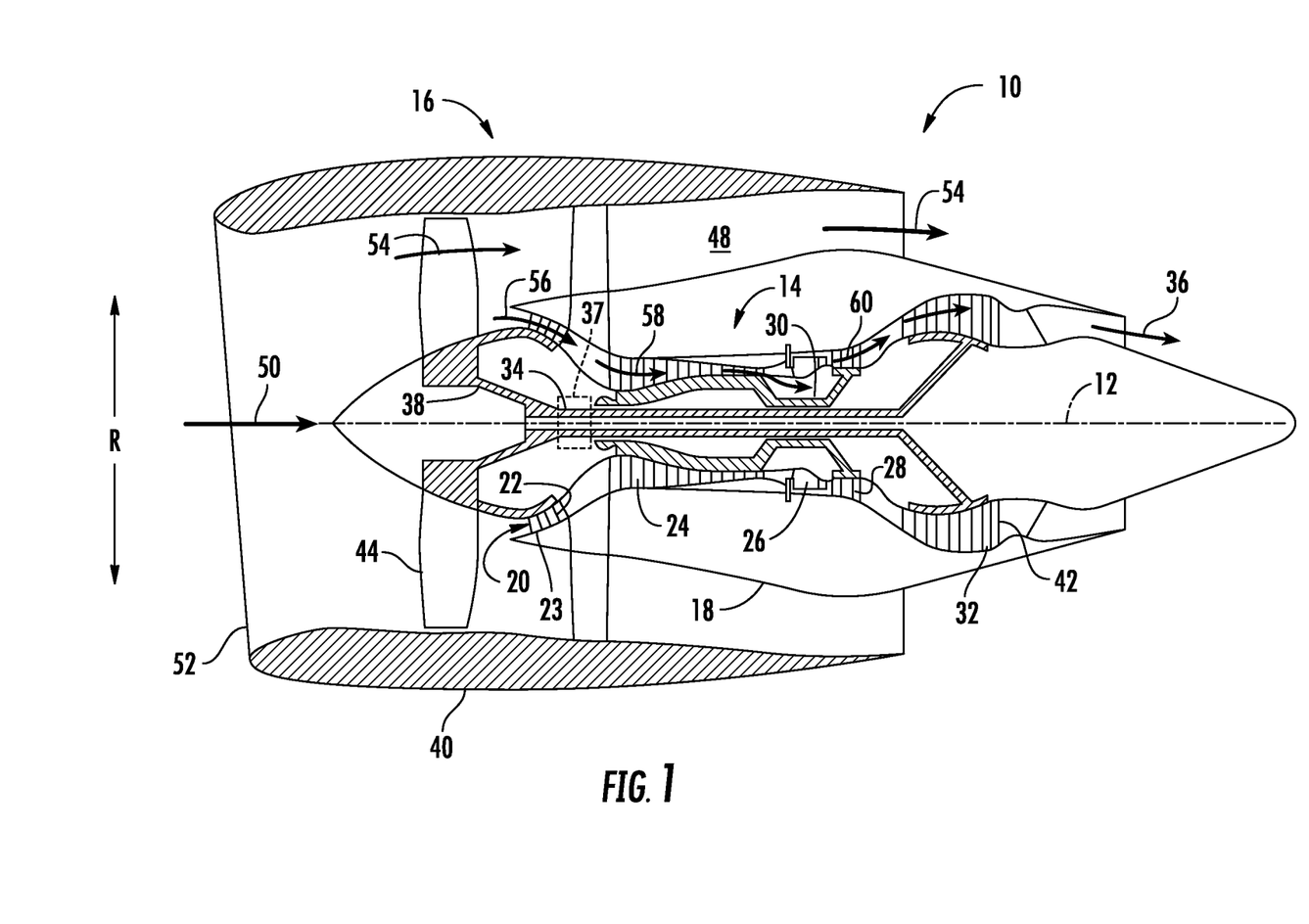
FIG. 1 provides a cross-sectional schematic view of an exemplary gas turbine engine in accordance with one or more embodiments of the present disclosure.

Referring now to the drawings, wherein identical numerals indicate the same elements throughout the figures, FIG. 1 is a schematic cross-sectional view of an exemplary high-bypass turbofan type engine 10. The turbofan engine 10 may be utilized within an aircraft in accordance with aspects of the present subject matter, with the engine 10 being shown having a longitudinal or axial centerline axis 12 extending therethrough for reference purposes.

Furthermore, as shown, the engine 10 includes a core gas turbine engine 14 and a fan section 16 positioned upstream thereof. The core engine 14 of the shown embodiment includes a substantially tubular outer casing 18 that defines an annular inlet 20. The outer casing 18 further encloses and supports a low pressure (LP) compressor 22 for increasing the pressure of the air that enters the core engine 14 to a first pressure level. A multi-stage high pressure (HP) compressor 24 subsequently receives the pressurized air from the LP compressor 22 and further increase the pressure of the received air. The pressurized air exiting the HP compressor 24 may then flow to a combustion section 26 within which fuel is injected into the flow of pressurized air. The resulting mixture is combusted within the combustion section 26. The high energy combustion products are directed from the combustion section 26 along a hot gas flowpath of the engine 10 to an HP turbine 28, the HP turbine driving the HP compressor 24 via an HP drive shaft 30. After the high energy combustion products are directed from the HP turbine 28, they may be further directed to an LP turbine 32, the LP turbine 32 driving the LP compressor 22 and fan section 16 via an LP drive shaft 34 that is generally coaxial with HP drive shaft 30. After driving each of turbines 28 and 32, the combustion products may be expelled from the core engine 14 via an exhaust nozzle 36 to provide propulsive jet thrust.

A plurality of inlet guide vanes 23 is positioned at the annular inlet 20 of the LP compressor 22. Generally, the inlet guide vanes 23 are disposed in an annular array about the centerline axis 12. The vanes 23 may be configured as variable geometry components, which may alter at least a portion of the geometry for the gas turbine engine 10. In certain embodiments, each inlet guide vane 23 may be configured as a variable geometry component and define a respective pitch axis about which it is rotatable by an actuator (not shown).

Rotating the inlet guide vanes 23 about their respective pitch axes may direct a flow of air through the core engine 14 and/or reduce an amount of airflow through the core turbine engine, as discussed below. Similarly, it should be appreciated that each turbine 28, 32 may generally include one or more turbine stages, with each stage including a plurality of guide vanes disposed in an annular array about the centerline axis 12 of the engine 10 for directing the flow of combustion products through the turbine stage towards a corresponding annular array of rotor blades forming part of the turbine rotor. As is generally understood, the inlet guide vanes 23 and/or rotor blades may be coupled to a rotor disk of a respective turbine rotor, which is, in turn, coupled to the engine's drive shaft (e.g., drive shaft 30 or 34).

Additionally, as shown in FIG. 1, the fan section 16 of the engine 10 includes a rotatable, axial-flow fan rotor 38 that is configured to be surrounded by an annular fan casing 40. For the exemplary embodiment depicted in FIG. 1, the LP drive shaft 34 is connected directly to the fan rotor 38, such as in a direct-drive configuration. In alternative configurations, however, the LP drive shaft 34 may be connected to the fan rotor 38 via a speed reduction device 37 such as a reduction gear gearbox in an indirect-drive or geared-drive configuration. Such speed reduction devices may be included between any suitable shafts/spools within engine 10 as desired or required.

The fan casing 40 may be configured to be supported relative to the core engine 14 by a plurality of substantially radially-extending, circumferentially-spaced outlet guide vanes 42. As such, the fan casing 40 encloses the fan rotor 38 and its corresponding fan rotor blades 44. Moreover, a downstream section 46 of the fan casing 40 extends over an outer portion of the core engine 14 so as to define a secondary, or by-pass, airflow conduit 48 that provides additional propulsive jet thrust. Similar to the above-described inlet guide vanes 23, the fan rotor blades 44 may be configured as variable geometry components capable of varying blade pitch according to one or more desired airflow characteristics.

During normal or routine operation of the engine 10, it should be appreciated that an initial airflow (indicated by arrow 50) may enter the engine 10 through an associated inlet 52 of the fan casing 40. The airflow 50 then passes through the fan blades 44 and splits into a first compressed airflow (indicated by arrow 54) that moves in a flowpath through conduit 48 and a second compressed airflow (indicated by arrow 56) which enters a flowpath of the LP compressor 22. The pressure of the second compressed airflow 56 is then increased and enters the HP compressor 24 (as indicated by arrow 58). After mixing with fuel and being combusted within the combustion section 26, the combustion products 60 exit the combustion section 26 and flow through the HP turbine 28. Thereafter, the combustion products 60 flow through the LP turbine 32 and exit the exhaust nozzle 36 to provide thrust for the engine 10.

It should be appreciated that the exemplary turbofan engine 10 depicted in FIG. 1 is provided by way of example only. In other exemplary embodiments, the engine 10 may have any other suitable configuration, such as an un-ducted, open rotor fan engine. Additionally, the engine 10 may include various actuators, guide vanes, ports, etc. not described herein or depicted in FIG. 1. Further, in still other exemplary embodiments, the engine 10 may instead be configured as any other suitable gas turbine engine. For example, in other exemplary embodiments, aspects of the present disclosure may be used in conjunction with, e.g., a turboshaft engine, turboprop engine, turbocore engine, turbojet engine, etc.

Figure 2:
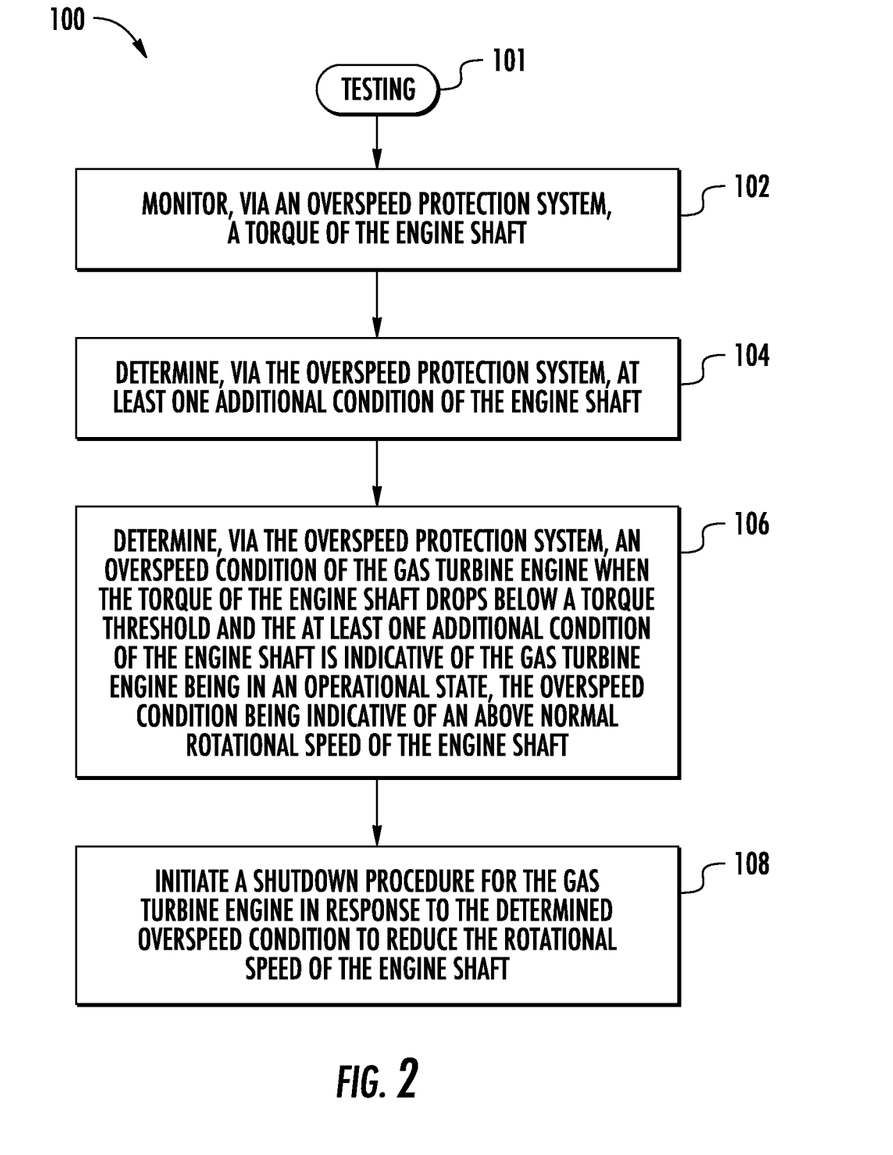
FIG. 2 provides a flow diagram view of an exemplary method for providing overspeed protection for a gas turbine engine in accordance with one or more embodiments of the present disclosure.

Referring now to FIG. 2, a flow diagram of a method 100 for providing overspeed protection for a gas turbine engine, such as engine 10 is provided according to exemplary embodiments of the present disclosure. Thus, it should be understood that the method 100 described herein may be implemented using one or more of the exemplary systems of FIGS. 1 and 3-4. Accordingly, the method 100 can be performed, for instance, by a controller 202 (FIG. 4) to protect an engine shaft (e.g., LP drive shaft or HP drive shaft) of a gas turbine engine during overspeed conditions. FIG. 2 depicts steps performed in a particular order for purpose of illustration and discussion. It should be appreciated, however, that certain steps of any of the methods disclosed herein can be modified, adapted, rearranged, omitted, or expanded in various ways without deviating from the scope of the present disclosure.

Turning to FIG. 2, the method 100 is illustrated for overspeed protection of an engine shaft (e.g., LP drive shaft 34 and/or HP drive shaft 30) in a gas turbine engine. Thus, as shown at (102), the method 100 includes monitoring, via an overspeed protection system 200 (FIG. 2), a torque of the engine shaft. As shown at (104), the method 100 includes determining, via the overspeed protection system 200, at least one additional condition of the engine shaft. As shown at (106), the method 100 includes determining, via the overspeed protection system 200, an overspeed condition of the gas turbine engine 10 when the torque of the engine shaft drops below a torque threshold and the additional condition (s) of the engine shaft is indicative of the gas turbine engine 10 being in an operational state (e.g., when the engine 10 is running). Further, as used herein, the overspeed condition may be indicative of an above normal rotational speed of the engine shaft.

In an embodiment, the torque threshold may be set from about 0.3% to about 70% of a rated torque of the LP turbine 32 of the engine 10. It should be understood that the torque threshold may be variable based on an operating speed of the engine 10 prior to determining the overspeed condition of the engine 10. Thus, as an example, at idle, the torque threshold may be in the range of about 0.3% to about 1.0%. Further, at cruise conditions, the torque threshold may be in the range of about 1% to about 20%. Moreover, at takeoff, the torque threshold may be in the range of about 1% to about 70%. Thus, torque measurements below the torque threshold are indicative of a faulty condition of the engine shaft. In alternative embodiments, the torque threshold may be a fixed value.

Referring still to FIG. 2, as shown at (108), the method 100 includes initiating a shutdown procedure for the engine 10 in response to the determined overspeed condition to reduce the rotational speed of the engine shaft. For example, in an embodiment, the shutdown procedure for the engine 10 may include shutting off fuel flow to the gas turbine engine, closing inlet guide vanes and/or compressor stators, opening a valve to release compressor discharge air, closing a variable area turbine nozzle, and/or closing blocker doors to stop air flow into a core inlet of the engine 10.

Figure 3:
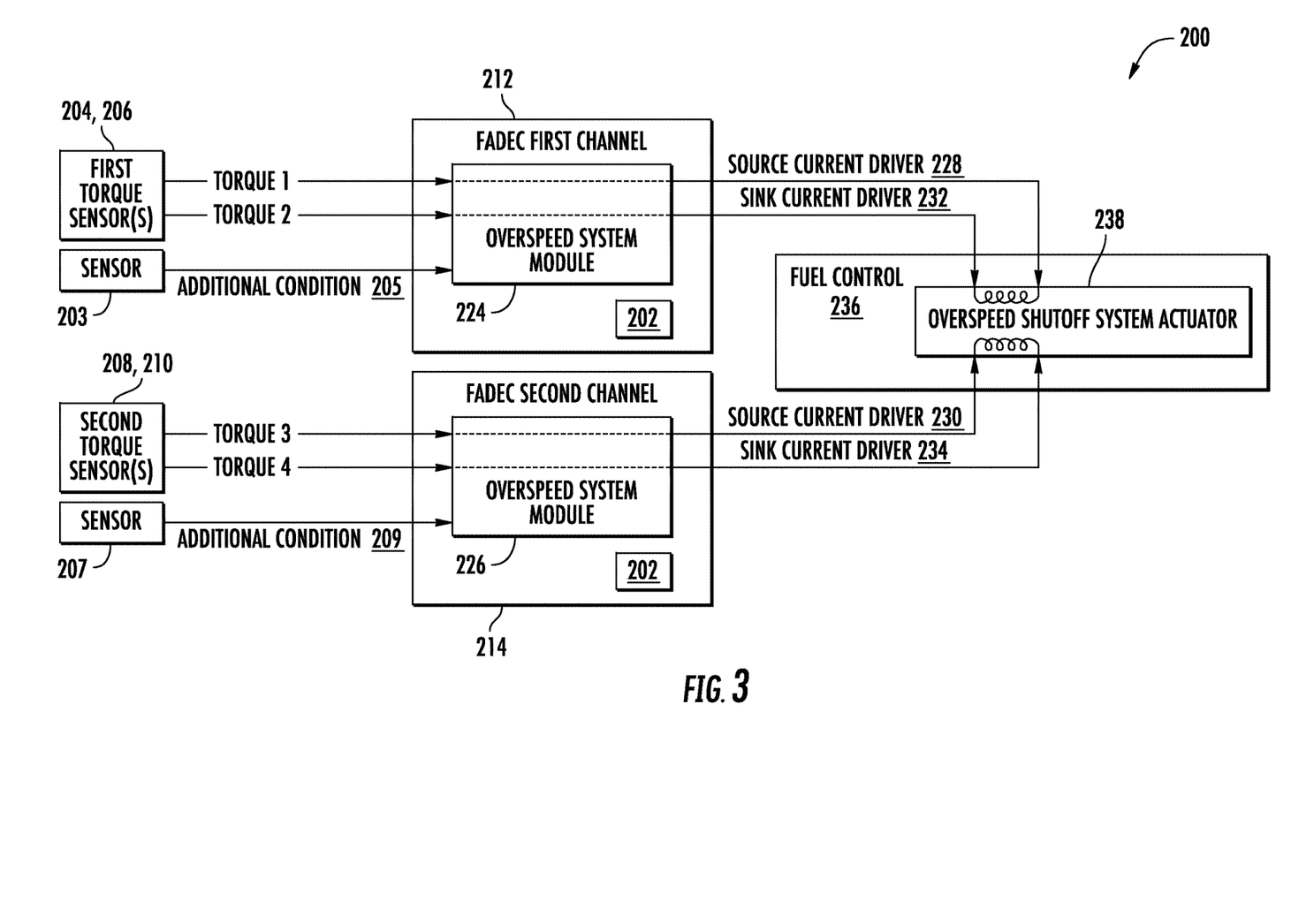
FIG. 3 provides a schematic diagram view of an exemplary overspeed protection system in accordance with one or more embodiments of the present disclosure.

In further embodiments, as shown at (101) in FIG. 2, the method 100 may also include various steps for testing the overspeed protection system 200 described herein. For example, in an embodiment, during an engine start sequence, the torque threshold may be increased to an artificially high value, so as to activate the overspeed protection system 200, prevent fuel flow to the combustion section 26, and verify that electrical current is flowing through a shutoff system actuator 238 (FIG. 3). Furthermore, the method 100 may include testing overspeed protection system 200, in which when an engine shutdown command is received, the torque threshold is raised to an artificially high value, so as to activate the overspeed protection system 200, and shutting down the engine 10.

Figure 4:
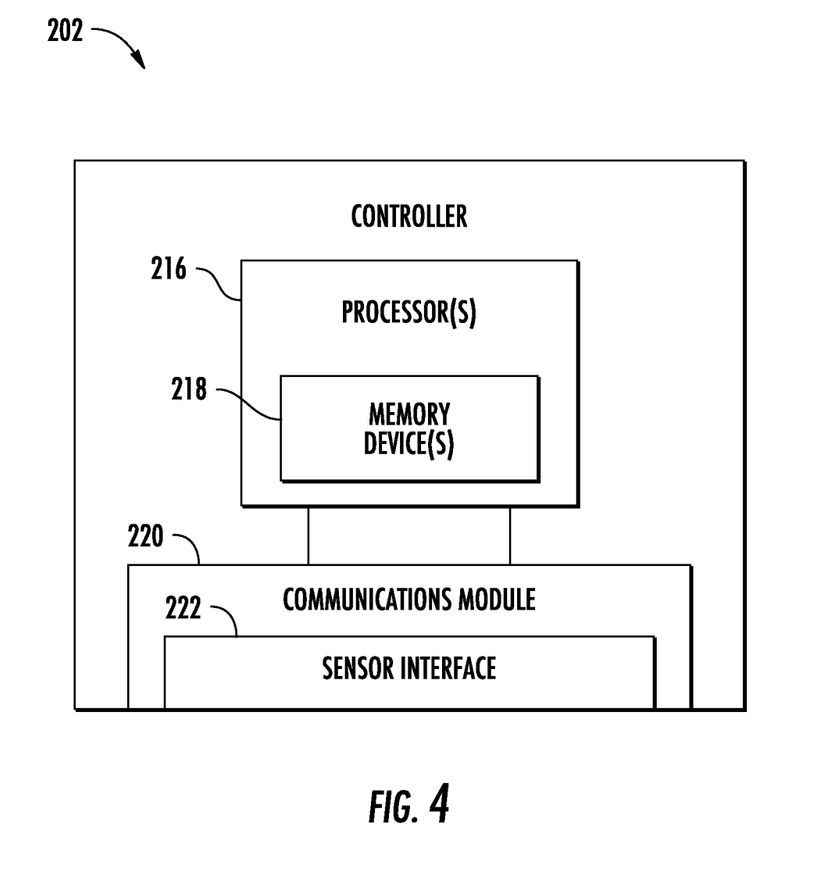
FIG. 4 provides a schematic block diagram view of an exemplary controller for an overspeed protection system in accordance with one or more embodiments of the present disclosure.

The method 100 of FIG. 2 can be better understood with reference to FIGS. 3 and 4. In particular, as shown in FIG. 3, a schematic diagram view of an exemplary overspeed protection system 200 in accordance with one or more embodiments of the present disclosure is provided. The system 200 may be incorporated into, e.g., the exemplary turbofan engine 10 of FIG. 1. Accordingly, the same or similar numbers may refer to the same or similar parts.

In particular, as shown, the overspeed protection system 200 may include at least one torque sensor (such as a plurality of torque sensors 204, 206, 208, 210) for monitoring the torque of the engine shaft. Thus, as shown, the torque sensor(s) 204, 206, 208, 210 provide one or more torque measurements to the overspeed protection system 200 (e.g., as represented by Torque 1, Torque 2, Torque 3, and Torque 4). In certain embodiments, the torque sensor(s) 204, 206, 208, 210 described herein may be, for example, a surface acoustic wave sensor, a strain gauge, a dynamometer, a transducer, a bulk acoustic wave sensor, a magnetostrictive sensor, a variable reluctance sensor, or any other suitable sensor for measuring torque.

In particular embodiments, as shown, the plurality of torque sensors 204, 206, 208, 210 may include at least one first torque sensor (e.g., a first pair of torque sensors 204, 206) in a first channel 212 and at least one second torque sensor (e.g., a second pair of torque sensors 208, 210) in a second channel 214. In such embodiments, as shown in the example of FIG. 3, the first and second pairs of torque sensors 204, 206, 208, 210 may be independent and redundant of each other.

Furthermore, as used herein, a "channel" generally refers to an electronic or digital channel. Thus, as shown in the illustrated embodiment of FIG. 3, the first and second channels 212, 214 may be configured as full authority digital engine (or electronics) control (FADEC) channels, or another suitable engine control unit. FADEC generally refer to systems that include a digital computer, such an "electronic engine controller" (EEC) or "engine control unit" (ECU), and its related accessories that control various aspects of engine performance. Accordingly, the first and second channels 212, 214 may each be configured as a controller 202, as shown in FIG. 4.

Referring particularly to FIG. 4, a block diagram of an embodiment of suitable components that may be included within the controller 202 in accordance with example aspects of the present disclosure is illustrated. As shown, the controller 202 may include one or more processor(s) 216, computer, or other suitable processing unit and associated memory device(s) 218 that may include suitable computer-readable instructions that, when implemented, configure the controller to perform various different functions, such as receiving, transmitting and/or executing wind turbine control signals (e.g., performing the methods, steps, calculations, and the like disclosed herein).

For example, in an embodiment, the controller 202 may be configured to detect or determine an overspeed condition, such as that caused by a break in an engine shaft (e.g., LP drive shaft 34 and/or HP drive shaft 30), at a core engine 14 (see FIG. 1) using one or more suitable sensors. The processor(s) 216 may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor(s) 216 may also include a microprocessor, or a combination of the aforementioned devices (e.g., a combination of a DSP and a microprocessor, a plurality of microprocessors, one or more microprocessors in conjunction with a DSP core, or any other such configuration).

Furthermore, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 218 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Accordingly, the memory device(s) 218 can store information accessible by processor(s), including instructions that can be executed by processor(s). For example, the instructions can be software or any set of instructions that when executed by the processor(s), cause the processor(s) to perform operations. For certain embodiments, the instructions include a software package configured to operate the system to, e.g., execute the exemplary method 100 described herein with reference to FIG. 2.

Additionally, the controller 202 may also include a communications interface 220 to facilitate communications between the controller and the various components of the engine 10. An interface can include one or more circuits, terminals, pins, contacts, conductors, or other components for sending and receiving control signals. Moreover, the controller 202 may include a sensor interface 222 (e.g., one or more analog-to-digital converters) to permit signals transmitted from the various sensors described herein to be converted into signals that can be understood and processed by the processor(s) 216.

Referring back to FIG. 3, as mentioned, the overspeed protection system 200 is configured to determine the overspeed condition of the gas turbine engine 10 using e.g., a combination of the torque of the engine shaft dropping below the torque threshold and at least one additional condition that is indicative of the engine 10 being in an operational state. For example, in an embodiment, as shown, the additional condition 205, 209 may be a speed condition of the engine 10. More particularly, in an embodiment, the speed condition may include speed (such as a speed of the LP turbine 32), velocity, acceleration, and/or a rate of acceleration of the engine shaft. In alternative embodiments, the additional condition 205, 209 may include, for example, fuel flow, a blade tip clearance, pressure, frequency, vibration, or any other condition indicative of the engine 10 being in an operational state (i.e., running).

Accordingly, in an embodiment, the overspeed protection system 200 is configured to measure (and/or receive) the speed condition of the engine shaft via at least one speed sensor 203, 207. In such embodiments, the speed sensor(s) 203, 207 may be a variable reluctance sensor, a surface acoustic wave sensor, an eddy current sensor, or any other suitable sensor. In particular embodiments, wherein the speed sensor(s) 203, 207 is the surface acoustic wave sensor, the same sensor may be used for measuring the additional condition (e.g., speed) and the torque.

In particular, as shown in FIG. 3, in an embodiment, the first and second channels 212, 214 of the overspeed protection system 200 may each include overspeed system modules 224, 226 configured to receive the torque measurements from the torque sensors 204, 206, 208, 210 and the additional condition(s) 205, 209. As such, in an embodiment, the overspeed system modules 224, 226 are configured to determine the overspeed condition of the gas turbine engine 10 using, e.g., a combination of the torque of the engine shaft dropping below the torque threshold and the additional condition(s) being in an operational state.

In an embodiment, for example, the overspeed system modules 224, 226 may determine the overspeed condition of the engine 10 by determining that the torque measurements from both of the first pair of torque sensors 204, 206 in the first channel 212 and/or both of the second pair of torque sensors 208, 210 in the second channel 214 have dropped below the torque threshold in combination with the additional condition(s) 205, 209 being indicative of the engine 10 being in the operational state (e.g., when the speed of the engine shaft exceeds a minimum speed threshold).

In alternative embodiments, the overspeed system modules 224, 226 may determine the overspeed condition of the engine 10 when a rate of change of the torque of the engine shaft drops below the torque threshold and the speed of the engine shaft exceeds a minimum speed threshold.

In yet another embodiment, the overspeed system modules 224, 226 may determine the overspeed condition of the engine 10 when the torque of the engine shaft drops below the torque threshold and the speed of the engine shaft increases above an additional speed threshold. In such embodiments, the additional speed threshold may be higher than the minimum speed threshold which indicates the engine 10 is turned on and running. Thus, the additional speed threshold also provides further indication that the speed is indicative of the overspeed condition. In additional embodiments, the overspeed system modules 224, 226 may determine the overspeed condition of the engine 10 when the torque of the engine shaft drops below the torque threshold and the rate of turbine acceleration of the engine shaft exceeds an acceleration threshold.

Still referring to FIG. 3, the overspeed system modules 224, 226 are configured to generate various output signals 228, 230, 232, 234 for a fuel control module 236 of the overspeed protection system 200. For example, as shown, the output signals 228, 230, 232, 234 may correspond to a source current driver output signal 228 and a sink current driver output signal 232 from the first overspeed system module 224 and a source current driver output signal 230 and a sink current driver output signal 234 from the second overspeed system module 226. Further, as shown, the fuel control module 236 of the overspeed protection system 200 may include an overspeed shutoff system actuator 238. Thus, as mentioned, the overspeed protection system 200 is configured to initiate a shutdown procedure for the engine 10 in response to the determined overspeed condition to reduce the rotational speed of the engine shaft. For example, in an embodiment, the shutdown procedure for the engine may include initiating the overspeed shutoff system actuator 238, thereby shutting off fuel flow to the engine 10 via the fuel control module 236. Other control actions may also be taken in combination with shutting off the fuel flow, such as, closing inlet guide vanes and/or compressor stators, opening a valve to release compressor discharge air, closing a variable area turbine nozzle, and/or closing blocker doors to stop air flow into a core inlet of the engine 10.

Figure 5:
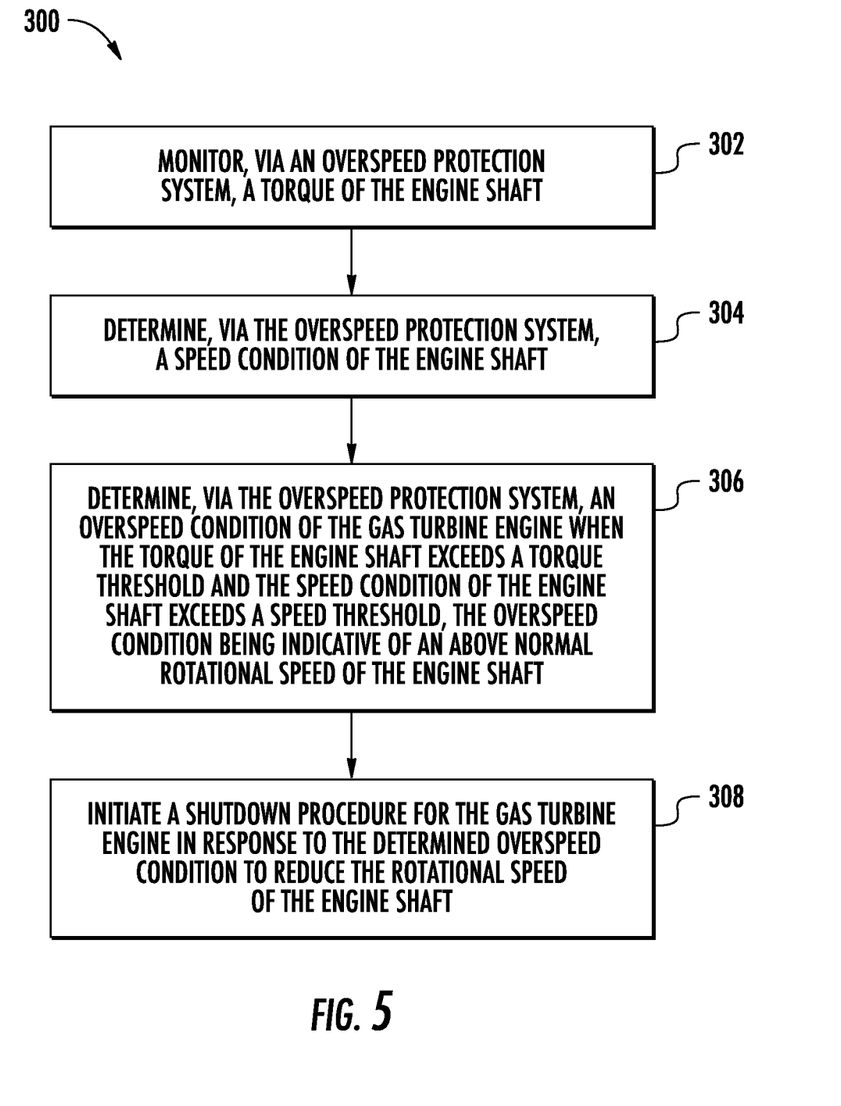
FIG. 5 provides a flow diagram view of another exemplary method for providing overspeed protection for a gas turbine engine in accordance with one or more embodiments of the present disclosure.

Referring now to FIG. 5, a flow diagram of another embodiment of a method 300 for providing overspeed protection for a gas turbine engine, such as engine 10, is provided according to exemplary embodiments of the present disclosure. It should be understood that the method 300 of FIG. 5 can be applied in addition to or as an alternative to the method 100 of FIG. 2. Thus, it should also be understood that the method 300 described herein may be implemented using one or more of the exemplary systems of FIGS. 1 and 3-4. Accordingly, the method 300 can be performed, for instance, by a controller 202 (FIG. 4) to protect an engine shaft (e.g., LP drive shaft or HP drive shaft) of a gas turbine engine during overspeed conditions. FIG. 5 depicts steps performed in a particular order for purpose of illustration and discussion. It should be appreciated, however, that certain steps of any of the methods disclosed herein can be modified, adapted, rearranged, omitted, or expanded in various ways without deviating from the scope of the present disclosure.

As shown at (302), the method 300 includes monitoring, via an overspeed protection system, a torque of the engine shaft. For example, in an embodiment, the torque may be monitored via one or more of the torque sensors 204, 206, 208, 210. As shown at (304), the method 300 includes determining, via the overspeed protection system, a speed condition of the engine shaft. For example, in an embodiment and as mentioned herein, the speed condition may include speed (such as a speed of the LP turbine 32), velocity, acceleration, and/or a rate of acceleration of the engine shaft.

Still referring to FIG. 5, as shown at (306), the method 300 includes determining, via the overspeed protection system, an overspeed condition of the gas turbine engine when the torque of the engine shaft exceeds a torque threshold and the speed condition of the engine shaft exceeds a speed threshold. Thus, the overspeed condition is indicative of an above normal rotational speed of the engine shaft. In particular, when the torque and the speed condition both exceed their respective thresholds, it is indicative of a condition where the engine shaft has not broken, but the engine is exceeding its rated speed, such as when the metering valve fails and is e.g., wide open. Thus, as shown at (308), the method 300 includes initiating a shutdown procedure for the gas turbine engine in response to the determined overspeed condition to reduce the rotational speed of the engine shaft.

Accordingly, the present disclosure provides an improved electronic overspeed protection system for a gas turbine engine that incorporates a sensor system that measures shaft torque to detect overspeed conditions. In particular, as discussed, the torque sensor system may incorporate independent and redundant sensors for two or more channels to provide the necessary reliability, as well as features to prevent sensor failures and/or false trips from causing inadvertent engine shutdown events. By using a reduction in shaft torque to initiate an overspeed shutdown, the system can be activated more quickly that using a speed sensor alone. Once the overspeed condition is detected, the shutdown procedure may include shutting off fuel flow, closing inlet guide vanes and/or compressor stators, opening a valve to release compressor discharge air, closing a variable area turbine nozzle, and/or closing blocker doors to stop air flow into a core inlet of the gas turbine engine.

Further aspects are provided by the subject matter of the following clauses:

Clause 1. A method for providing overspeed protection for a gas turbine engine, the gas turbine engine having an engine shaft, the method comprising:
monitoring, via an overspeed protection system, a torque of the engine shaft;
determining, via the overspeed protection system, at least one additional condition of the engine shaft;
determining, via the overspeed protection system, an overspeed condition of the gas turbine engine when the torque of the engine shaft drops below a torque threshold and the at least one additional condition of the engine shaft is indicative of the gas turbine engine being in an operational state, the overspeed condition being indicative of an above normal rotational speed of the engine shaft; and initiating a shutdown procedure for the gas turbine engine in response to the determined overspeed condition to reduce the rotational speed of the engine shaft.

Clause 2. The method of clause 1, wherein the torque of the engine shaft is measured via at least one torque sensor.

Clause 3. The method of any of the preceding clauses, wherein the at least one torque sensor comprises at least one of a surface acoustic wave sensor, a strain gauge, a dynamometer, a transducer, a bulk acoustic wave sensor, a magnetostrictive sensor, or a variable reluctance sensor.

Clause 4. The method of any of the preceding clauses, wherein the at least one torque sensor comprises a plurality of torque sensors, the plurality of torque sensors comprising at least one first torque sensor in a first channel and at least one second torque sensor in a second channel.

Clause 5. The method of any of the preceding clauses, wherein the at least one first torque sensor in the first channel and the at least one second torque sensor in the second channel further comprise a first pair of torque sensors in the first channel and a second pair of torque sensors in the second channel, the first and second pairs of torque sensors being independent and redundant of each other.

Clause 6. The method of any of the preceding clauses, wherein determining the overspeed condition of the gas turbine engine when the torque of the engine shaft drops below the torque threshold further comprises:
determining that torque measurements from both of the first pair of torque sensors in the first channel or both of the second pair of torque sensors in the second channel have dropped below the torque threshold.

Clause 7. The method of any of the preceding clauses, wherein the torque threshold is set to about 0.3% to about 70% of a rated torque of a low pressure turbine of the gas turbine engine, the torque threshold being indicative of a faulty condition of the engine shaft.

Clause 8. The method of any of the preceding clauses, wherein the torque threshold is variable based on an operating speed of the gas turbine engine prior to determining the overspeed condition of the gas turbine engine.

Clause 9. The method of any of the preceding clauses, wherein the at least one additional condition comprises a speed condition of the engine shaft, the speed condition being at least one of speed, velocity, acceleration, or a rate of acceleration of the engine shaft.

Clause 10. The method of any of the preceding clauses, wherein determining the overspeed condition of the gas turbine engine when the torque of the engine shaft drops below the torque threshold and the additional condition of the engine shaft is indicative of the gas turbine engine being in the operational state further comprises:
determining the overspeed condition of the gas turbine engine when the torque of the engine shaft drops below the torque threshold and the speed of the engine shaft exceeds a minimum speed threshold.

Clause 11. The method of any of the preceding clauses, wherein determining the overspeed condition of the gas turbine engine when the torque of the engine shaft drops below the torque threshold and the additional condition of the engine shaft is indicative of the gas turbine engine being in the operational state further comprises:
determining the overspeed condition of the gas turbine engine when a rate of change of the torque of the engine shaft drops below the torque threshold and the speed of the engine shaft exceeds a minimum speed threshold.

Clause 12. The method of any of the preceding clauses, wherein determining the overspeed condition of the gas turbine engine when the torque of the engine shaft drops below the torque threshold and the additional condition of the engine shaft is indicative of the gas turbine engine being in the operational state further comprises:
determining the overspeed condition of the gas turbine engine when the torque of the engine shaft drops below the torque threshold and the speed of the engine shaft increases above an additional speed threshold.

Clause 13. The method of any of the preceding clauses, wherein determining the overspeed condition of the gas turbine engine when the torque of the engine shaft drops below the torque threshold and the additional condition of the engine shaft is indicative of the gas turbine engine being in the operational state further comprises:
determining the overspeed condition of the gas turbine engine when the torque of the engine shaft drops below the torque threshold and the rate of turbine acceleration of the engine shaft exceeds an acceleration threshold.

Clause 14. The method of any of the preceding clauses, further comprising measuring the speed condition of the engine shaft via at least one speed sensor, the at least one speed sensor being at least one of a variable reluctance sensor, a surface acoustic wave sensor, or an eddy current sensor.

Clause 15. The method of any of the preceding clauses, wherein the at least one speed sensor and the at least one torque sensor are the same sensor.

Clause 16. The method of any of the preceding clauses, wherein the additional condition comprises one of fuel flow, a blade tip clearance, pressure, frequency, or vibration.

Clause 17. The method of any of the preceding clauses, wherein initiating the shutdown procedure for the gas turbine engine in response to the determined overspeed condition further comprises at least one of:
shutting off fuel flow to the gas turbine engine, closing inlet guide vanes and/or compressor stators, opening a valve to release compressor discharge air, closing a variable area turbine nozzle, and closing blocker doors to stop air flow into a core inlet of the gas turbine engine.

Clause 18. The method of any of the preceding clauses, further comprising increasing the torque threshold during startup of the gas turbine engine to an increased torque threshold to activate the overspeed protection system, prevent fuel flow to a combustor of the gas turbine engine, and verify that electrical current is flowing through the overspeed protection system.

Clause 19. A method for providing overspeed protection for a gas turbine engine, the gas turbine engine having an engine shaft, the method comprising:
    monitoring, via an overspeed protection system, a torque of the engine shaft;
    determining, via the overspeed protection system, a speed condition of the engine shaft;
    determining, via the overspeed protection system, an overspeed condition of the gas turbine engine when the torque of the engine shaft exceeds a torque threshold and the speed condition of the engine shaft exceeds a speed threshold, the overspeed condition being indicative of an above normal rotational speed of the engine shaft; and
    initiating a shutdown procedure for the gas turbine engine in response to the determined overspeed condition to reduce the rotational speed of the engine shaft.

Clause 20. An overspeed protection system for providing overspeed protection for a gas turbine engine, the gas turbine engine having an engine shaft, the overspeed protection system comprising:
    at least one torque sensor;
    a controller communicatively coupled to the at least one torque sensor, the controller comprising at least one processor, the at least one processor configured to perform a plurality of operations, the plurality of operations comprising:
    monitoring a torque of the engine shaft;
    determining at least one additional condition of the engine shaft;
    determining an overspeed condition of the gas turbine engine when the torque of the engine shaft drops below a torque threshold and the at least one additional condition of the engine shaft is indicative of the gas turbine engine being in an operational state, the overspeed condition being indicative of an above normal rotational speed of the engine shaft; and
    initiating a shutdown procedure for the gas turbine engine in response to the determined overspeed condition to reduce the rotational speed of the engine shaft.

Clause 21. A non-transitory computer-readable storage medium comprising instructions that, when executed by at least one processor, cause the at least one processor to:
    monitor a torque of the engine shaft;
    determine at least one additional condition of the engine shaft;
    determine an overspeed condition of the gas turbine engine when the torque of the engine shaft drops below a torque threshold and the at least one additional condition of the engine shaft is indicative of the gas turbine engine being in an operational state, the overspeed condition being indicative of an above normal rotational speed of the engine shaft; and
    initiate a shutdown procedure for the gas turbine engine in response to the determined overspeed condition to reduce the rotational speed of the engine shaft.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for providing overspeed protection for a gas turbine engine, the gas turbine engine having an engine shaft, the method comprising:
    monitoring, via an overspeed protection system, a torque of the engine shaft;
    determining, via the overspeed protection system, at least one additional condition of the engine shaft;
    receiving an engine shutdown command;
    as a result of receiving the engine shutdown command, changing a torque threshold from a first torque threshold value to a second torque threshold value to test the overspeed protection system, the second torque threshold value higher than the first torque threshold value; and
    determining, via the overspeed protection system, an overspeed condition of the gas turbine engine as a result of the torque of the engine shaft being below the second torque threshold value of the torque threshold and the at least one additional condition of the engine shaft is indicative of the gas turbine engine being in an operational state, the overspeed condition being indicative of an above normal rotational speed of the engine shaft; and
    initiating a shutdown procedure for the gas turbine engine in response to the determined overspeed condition to reduce the rotational speed of the engine shaft.

2. The method of claim 1, wherein the torque of the engine shaft is measured via at least one torque sensor.

3. The method of claim 2, wherein the at least one torque sensor comprises at least one of a surface acoustic wave sensor, a strain gauge, a dynamometer, a transducer, a bulk acoustic wave sensor, a magnetostrictive sensor, or a variable reluctance sensor.

4. The method of claim 2, wherein the at least one torque sensor comprises a plurality of torque sensors, the plurality of torque sensors comprising at least one first torque sensor in a first channel and at least one second torque sensor in a second channel.

5. The method of claim 4, wherein the at least one first torque sensor in the first channel and the at least one second torque sensor in the second channel further comprise a first pair of torque sensors in the first channel and a second pair of torque sensors in the second channel, the first and second pairs of torque sensors being independent and redundant of each other.

6. The method of claim 5, wherein determining the overspeed condition of the gas turbine engine when the torque of the engine shaft drops below the torque threshold further comprises:
    determining that torque measurements from both of the first pair of torque sensors in the first channel or both of the second pair of torque sensors in the second channel have dropped below the torque threshold.

7. The method of claim 1, wherein the torque threshold is variable based on an operating speed of the gas turbine engine prior to determining the overspeed condition of the gas turbine engine.

8. The method of claim 2, wherein the at least one additional condition comprises a speed condition of the engine shaft, the speed condition being at least one of speed, velocity, acceleration, or a rate of acceleration of the engine shaft.

9. The method of claim 8, wherein determining the overspeed condition of the gas turbine engine as a result of the torque of the engine shaft being below the second torque threshold value of the torque threshold and the additional condition of the engine shaft is indicative of the gas turbine engine being in the operational state further comprises:
    determining the overspeed condition of the gas turbine engine as a result of a speed of the engine shaft being above a minimum speed threshold.

10. The method of claim 8, wherein determining the overspeed condition of the gas turbine engine as a result of the torque of the engine shaft being below the second torque threshold value of the torque threshold and the additional condition of the engine shaft is indicative of the gas turbine engine being in the operational state further comprises:
    determining the overspeed condition of the gas turbine engine as a result of a rate of change of the torque of the engine shaft being below the second torque threshold value of the torque threshold and the speed of the engine shaft being above a minimum speed threshold.

11. The method of claim 8, wherein determining the overspeed condition of the gas turbine engine as a result of the torque of the engine shaft being below the second torque threshold value of the torque threshold and the additional condition of the engine shaft is indicative of the gas turbine engine being in the operational state further comprises:
    determining the overspeed condition of the gas turbine engine when as a result of the speed of the engine shaft being above a speed threshold.

12. The method of claim 8, wherein determining the overspeed condition of the gas turbine engine as a result of the torque of the engine shaft being below the second torque threshold value of the torque threshold and the additional condition of the engine shaft is indicative of the gas turbine engine being in the operational state further comprises:
    determining the overspeed condition of the gas turbine engine when as a result of the rate of turbine acceleration of the engine shaft being above an acceleration threshold.

13. The method of claim 8, further comprising measuring the speed condition of the engine shaft via at least one speed sensor, the at least one speed sensor being at least one of a variable reluctance sensor, a surface acoustic wave sensor, or an eddy current sensor.

14. The method of claim 13, wherein the at least one speed sensor and the at least one torque sensor are the same sensor.

15. The method of claim 1, wherein the additional condition comprises one of fuel flow, a blade tip clearance, pressure, frequency, or vibration.

16. The method of claim 1, wherein as a result of determining the overspeed condition further comprises at least one of:
    shutting off fuel flow to the gas turbine engine, closing inlet guide vanes and/or compressor stators, opening a valve to release compressor discharge air, closing a variable area turbine nozzle, and closing blocker doors to stop air flow into a core inlet of the gas turbine engine.

17. The method of claim 1, further comprising increasing the torque threshold during startup of the gas turbine engine to an increased torque threshold to activate the overspeed protection system, prevent fuel flow to a combustor of the gas turbine engine, and verify that electrical current is flowing through the overspeed protection system.

18. A method for providing overspeed protection for a gas turbine engine, the gas turbine engine having an engine shaft, the method comprising:
    monitoring, via an overspeed protection system, a torque of the engine shaft;
    determining, via the overspeed protection system, a speed condition of the engine shaft;
    evaluating whether a torque conditional is satisfied based upon the torque of the engine shaft and a torque threshold, the torque conditional being satisfied when the torque of the engine exceeds the torque threshold;
    evaluating whether an overspeed conditional is satisfied based upon the speed condition of the engine shaft and a speed threshold, the overspeed conditional being satisfied when the speed condition of the engine shaft exceeds the speed threshold;
    determining, via the overspeed protection system, that an overspeed condition is present within the gas turbine engine when both the torque conditional is satisfied and the overspeed conditional is satisfied, the overspeed condition being indicative of an above normal rotational speed of the engine shaft; and
    initiating a shutdown procedure for the gas turbine engine in response to the determined overspeed condition to reduce the rotational speed of the engine shaft.

19. An overspeed protection system for providing overspeed protection for a gas turbine engine, the gas turbine engine having an engine shaft, the overspeed protection system comprising:
    at least one torque sensor;
    a controller communicatively coupled to the at least one torque sensor, the controller comprising at least one processor, the at least one processor configured to perform a plurality of operations, the plurality of operations comprising:
        monitoring a torque of the engine shaft;
        determining at least one additional condition of the engine shaft;
        receiving an engine shutdown command;
        as a result of receiving the engine shutdown command, changing a torque threshold from a first torque threshold value to a second torque threshold value to test the overspeed protection system, the second torque threshold value higher than the first torque threshold value; and
        determining an overspeed condition of the gas turbine engine as a result of the torque of the engine shaft being below the second torque threshold value of the torque threshold and the at least one additional condition of the engine shaft is indicative of the gas turbine engine being in an operational state, the overspeed condition being indicative of an above normal rotational speed of the engine shaft; and
        initiating a shutdown procedure for the gas turbine engine in response to the determined overspeed condition to reduce the rotational speed of the engine shaft.

* * * * *